Figure 1:
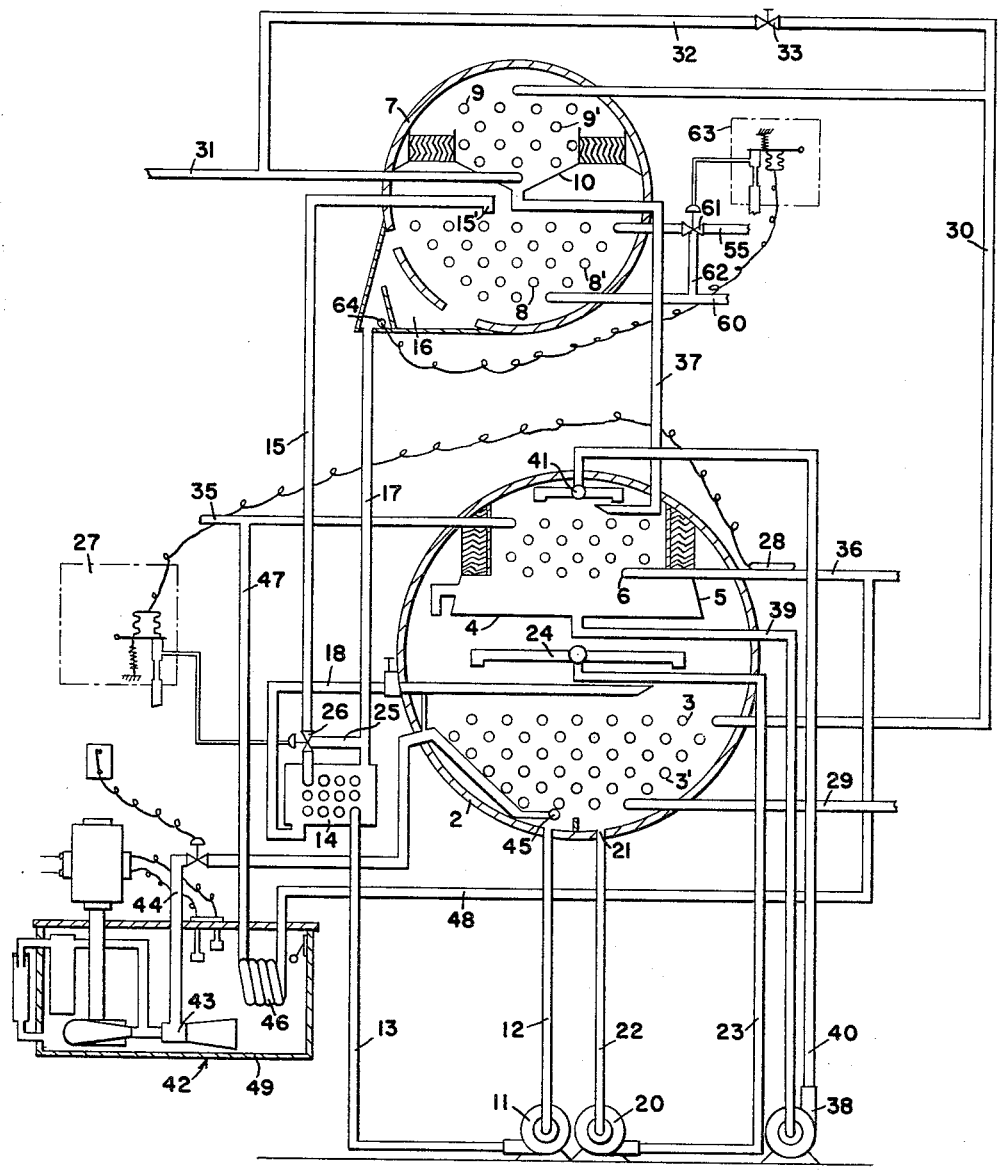

Sept. 11, 1962     L. H. LEONARD, JR     3,053,056
ABSORPTION REFRIGERATION SYSTEMS AND
CONTROL ARRANGEMENTS THEREFOR
Filed March 2, 1960     2 Sheets-Sheet 1

FIG. I

*INVENTOR.*
LOUIS H. LEONARD JR.
BY
ATTORNEY.

United States Patent Office 3,053,056
Patented Sept. 11, 1962

3,053,056
ABSORPTION REFRIGERATION SYSTEMS AND CONTROL ARRANGEMENTS THEREFOR
Louis H. Leonard, Jr., Dewitt, N.Y., assignor to Carrier Corporation, Syracuse, N.Y., a corporation of Delaware
Filed Mar. 2, 1960, Ser. No. 12,352
16 Claims. (Cl. 62—104)

This invention relates to absorption refrigeration systems and to a control arrangement therefor and, more particularly, to an absorption refrigeration system employing a saline solution as an absorbent and a medium miscible therewith as a refrigerant and to a method of operating the same.

An absorption refrigeration system and control arrangement therefor are disclosed in application Serial No. 2,203, filed January 13, 1960, in the name of Louis H. Leonard, Jr. entitled Absorption Refrigeration Systems and Method of Operating the Same. In this system, steam is employed as a heating medium to boil refrigerant from solution in the generator thereby reconcentrating the solution. A highly effective control arrangement is provided which involves bypassing weak solution about the generator at partial load to precipitate salt from solution in the generator thereby decreasing the capacity of the system, while, upon an increase in load imposed upon the system, an increased quantity of solution is again routed to the generator to absorb precipitated salt thereby increasing the capacity of the system. In this system, maximum solution concentration at full load is maintained because the steam pressure in the generator is predetermined and the amount of cooling water passing through the condenser is also predetermined.

While this control arrangement is very effective when steam is employed as the heating medium in the generator, it imposes certain problems when a liquid heating medium, such as hot water, is employed as the heating medium in the generator or heat exchange surface. An absorption refrigeration system is, of course, designed with a margin of safety or in other words, excess heat exchange surface is provided. At full load operation, solution leaving the absorber passes to the generator, and is placed in heat exchange relation with the hot water in the generator tubes.

If we consider, for example, that the temperature of the hot water supplied to the generator may vary from day to day when the system is placed in full load operation, and the generator and condenser attempt to utilize the heat exchange surface as efficiently as possible, undesirable changes in the concentration of solution leaving the generator result with resulting problems arising from possible precipitation or crystallization of salt in the solution heat exchanger. Even with installations where the entering hot water temperature remains relatively constant, the generator may have excess surface for the particular selection so that full flow of the hot water results in high solution concentrations which in turn result in precipitation or crystallization of salt in the heat exchanger. It becomes extremely difficult to control full load solution concentration for an increase in load above load design conditions, change in condensing temperature, or an increase in the temperature of hot water supplied to the generator increases the concentration and temperature of strong solution leaving the generator.

I have found that these problems may be eliminated if, at full load, a substantially constant predetermined temperature of solution leaving the generator is maintained, which, in effect, prevents concentration of solution, leaving the generator from increasing beyond the maximum design point. By varying the quantity of hot water supplied to the generator at full load in response to the temperature of strong solution leaving the generator, concentration of solution at full load may be prevented from increasing beyond a predetermined point. When operation at less than full load is contemplated in such a system it is found that as the load imposed upon the system decreases, solution bypasses the generator so that less solution is placed in heat exchange relation with the hot water. While concentration of solution leaving the generator tends to increase under these conditions, and in fact, concentration of the solution in the generator should be increased to permit salt to precipitate therefrom, the bypass control operates to bypass an increasing volume of solution as the load on the system decreases thus obtaining the predetermined concentration of solution entering the absorber and obviating any problems of crystallization or precipitation of salt in the solution heat exchanger.

By the present invention satisfactory control of the system may be maintained over a wide range when a heated liquid medium such as hot water, for example, is employed in the generator by maintaining the solution temperature leaving the generator substantially constant without being affected by the demand for heat which is imposed upon the system. I have pointed out previously as load decreases the concentration of strong solution leaving the generator tends to increase; such increase is not harmful since weak solution is mixed with strong solution before it passes into the solution heat exchanger so that crystallization or precipitation of salt from the solution in the heat exchanger is eliminated.

Under some circumstances, when the load imposed upon the system is extremely small, no strong solution leaves the generator with the result that the temperature of the control element sensing the temperature of strong solution leaving the generator tends to decrease; this variation in temperature sensed by the element normally would call for an increase in the volume of hot water supplied to the generator which, under these circumstances, would be highly undesirable.

In the present invention, a second control may be provided which, when this condition exists, overrides the solution temperature responsive control and, in turn, regulates the quantity of hot water supplied to the generator in response to the temperature of hot water leaving the generator thus preventing overheating of solution remaining in the generator which would greatly increase the concentration therein, far beyond the desired concentration.

The term "weak solution" is used herein to describe a solution weak in absorbing power. The term "strong solution" is used herein to define a solution strong in absorbing power.

The chief object of the present invention is to provide a control arrangement for an absorption refrigeration system of the type described which obviates the problems inherent in the system when a liquid heating medium is employed in the generator.

An object of the invention is to provide a control arrangement for an absorption refrigeration system including a control for varying the flow of weak solution to the generator and a second control responsive to the temperature of strong solution leaving the generator for maintaining a desired mean effective temperature difference in the generator at full load operation thereby maintaining a substantially constant temperature of strong solution leaving the generator.

A further object is to provide a control arrangement for an absorption refrigeration system including a control for varying the flow of weak solution to the generator, a second control responsive to the temperature of strong solution leaving the generator for maintaining a desired means effective temperature difference in the generator by regulating the quantity of hot water supplied to the generator in heat exchange relation with solution in the generator, and a third control adapted to override the second control when it no longer senses the temperature of strong solution leaving the generator, the third control being responsive to the temperature of liquid heating medium leaving the generator to vary the quantity of liquid heating medium supplied to the generator.

A further object is to provide a method of operation of an absorption refrigeration system. Other objects of the invention will be readily perceived by reference to the following description.

This invention relates to a method of operation of an absorption refrigeration system including an absorber, an evaporator, a generator, a condenser, a heat exchanger for strong and weak solutions, and employing a saline solution as absorbent and a material miscible therewith as a refrigerant in which the steps consist in supplying weak solution from the absorber to the generator, supplying strong solution from the generator to the absorber, supplying a liquid heating medium to the generator in heat exchange relation with solution therein, supplying a condensing medium to the condenser in heat exchange relation with vapor therein to condense the same, returning the condensate to the evaporator, regulating the quantity of liquid heating medium supplied to the generator in response to the temperature of strong solution leaving the generator, at partial load, diverting at least a portion of the weak solution to return to the absorber before it is passed in heat exchange relation with liquid heating medium in the generator, and mixing the diverted weak solution with strong solution prior to the passage of the strong solution to the heat exchanger.

This invention further relates to an absorption refrigeration system comprising in combination an absorber, an evaporator, a generator, a condenser, means for passing weak solution from the absorber to the generator, means for passing strong solution from the generator to the absorber, means for supplying a liquid heating medium to the generator, means for regulating the supply of liquid heating medium to the generator and a control arrangement operable in response to the temperature of strong solution leaving the generator to actuate said regulating means, and means adapted upon partial load imposed on the system to precipitate salt from solution in the generator thereby decreasing the capacity of the system, said precipitating means upon an increase in load imposed upon the system permitting solution in the generator to absorb the precipitated salt thereby increasing the capacity of the system.

Figure 2:
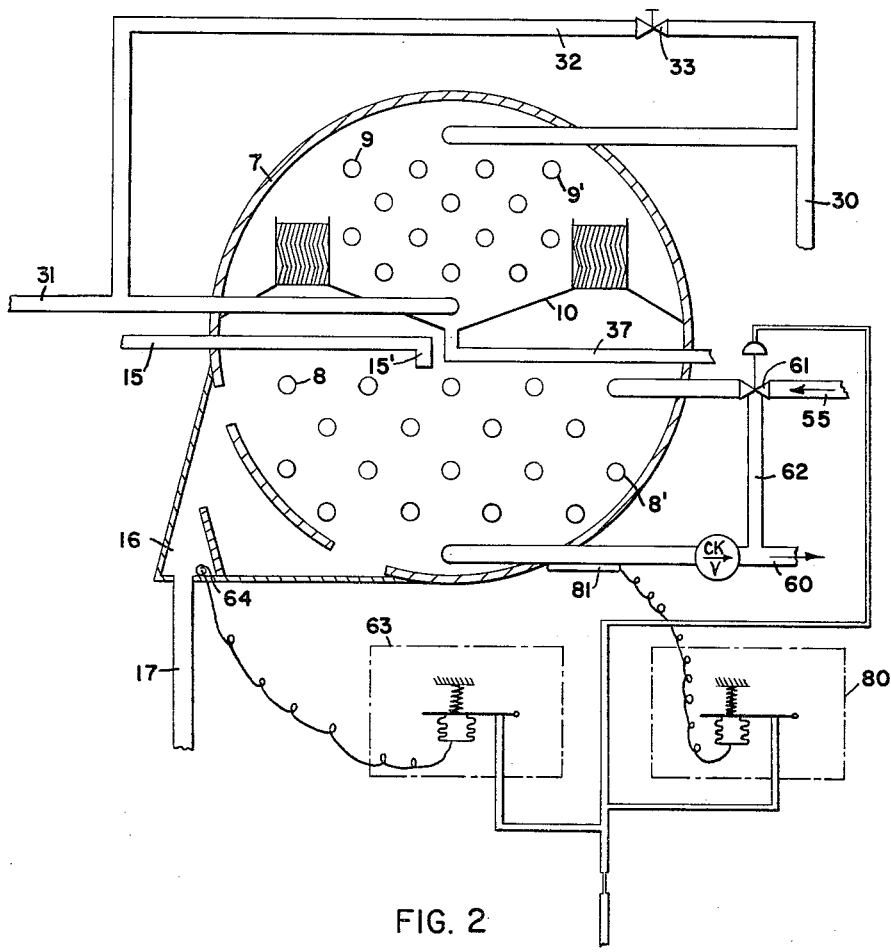

The attached drawings illustrate a preferred embodiment of the invention, in which:

FIGURE 1 is a diagrammatic view illustrating the absorption refrigeration system and control arrangement of the present invention; and FIGURE 2 is a diagrammatic view illustrating a modified control arrangement for the absorption refrigeration system disclosed in FIGURE 1.

Referring to FIGURE 1, there is illustrated diagrammatically the absorption refrigeration system and control arrangement of the present invention. The system comprises a shell 2 containing a plurality of tubes 3 which cooperate with the shell to form an absorber 3'. Placed in shell 2 above the absorber is a pan-like member 4 which cooperates with the shell 2 to form an evaporator 5. The evaporator includes a plurality of tubes 6 extending longitudinally of the shell above the absorber 3'. Medium to be cooled passes through these tubes in heat exchange relation with liquid refrigerant sprayed thereover.

A second shell 7 preferably is placed above the first shell. Tubes 8 extend in the lower portion of shell 7 and cooperate with shell 7 to form a generator 8'. A plurality of tubes 9 are placed in the upper portion of shell 7 to form a condenser 9'. The tubes 9 cooperate with pan-like member 10 to form the condenser 9'.

Pump 11 withdraws weak solution from absorber 3' through line 12. Pump 11 forwards weak solution through line 13 to heat exchanger 14 in which weak solution is placed in heat exchange relation with strong solution returning from the generator, as hereinafter described. The weak solution is then forwarded from the heat exchanger 14 through line 15 to generator 8', being discharged therein through a suitable spray arrangement 15'. Spray arrangement 15' may include two pipes located at each end of the generator with the pipe placed nearest to the overflow arrangement 16 placed slightly lower than the other for more satisfactory partial load operation. Strong solution flows from generator 8' through the overflow arrangement 16, line 17, heat exchanger 14, and line 18 to the absorber 3', preferably, being discharged therein adjacent one end of shell 2; that is, strong solution flows through forces of gravity from the generator to the absorber. It will be understood, of course, if desired, the strong solution may be discharged in the absorber over the tubes therein.

Pump 20 serves as an absorber pump and is employed to withdraw solution of intermediate concentration from absorber 3' through outlet 21 and line 22. Pump 20 forwards the solution of intermediate concentration through line 23 to spray arrangement 24 of the absorber 3'. Spray arrangement 24 serves to distribute the recirculated solution over the tubes throughout the absorber 3'. It will be understood, the strong solution mixes to some extent with solution in the absorber and that complete mixing occurs as the pump 20 forwards the mixed solution so that a solution having a concentration intermediate the concentration of the strong and weak solutions is circulated. Reference is made to United States Patent No. 2,840,997, granted July 1, 1958, for a more detailed description of the flow of solution in the system.

A bypass line 25 is placed adjacent heat exchanger 14 and serves to connect line 15 with line 17 on the generator side of the heat exchanger; a three-way modulating valve 26 is placed preferably at the juncture of line 25 with line 15, for a purpose hereinafter explained. It is desirable to place valve 26 as close as possible to the heat exchanger 14 to assure that a head exists in the weak solution line. Thus, if the valve is modulated to assure that all weak solution flows through the bypass line 25 the head in such line would prevent weak solution bleeding to the generator. Valve 26 is a pneumatically operable valve actuated by a control 27 responsive to temperature indicated by a bulb 28. The function and operation of this control arrangement will be described in more detail hereinafter.

Condensing water is forwarded by a pump (not shown) through line 29 to the tubes 3 of absorber 3'. The condensing water passes from the tubes 3 of the absorber through line 30 to the tubes 9 of the condenser. Condensing water leaves the tubes 9 of the condenser through line 31. A bypass line 32 is provided about the tubes 9 of the condenser, extending from line 30 to line 31. A manual valve 33 is placed in bypass line 2. This bypass permits the flow of condensing water through the tubes of the condenser to be adjusted at full load when the system is installed; thereafter, no adjustment of the flow of condensing water through the tubes of the condenser is required.

Medium to be cooled is forwarded by a pump (not shown) through a line 35 to the tubes 6 of the evaporator. The cooled medium leaves the tubes 6 through line 36 and is forwarded to a place of use such as the central station of an air conditioning system. The medium after passing through the central station returns to the evaporator through line 35 to be again cooled and reused. Preferably, bulb 28 of control arrangement 27 is placed on line 36 to reflect the temperature of cooled medium leaving the evaporator which in effect indicates the load imposed upon the system.

Condensate leaves pan 10 of the condenser through line 37 and is returned to the evaporator and discharged therein over the tubes 6 to wet the utbes. It will be appreciated the refrigerant is flashed or vaporized by the heat exchange relation with medium passing through the tubes. Flashed vapor passes to the absorber to be absorbed by solution therein.

Pump 38 serves to recirculate liquid refrigerant collected in the evaporator about the evaporator. Pump 38 is connected to the evaporator by line 39 to withdraw liquid refrigerant therefrom. Pump 38 forwards the liquid refrigerant through line 40 to spray arrangement 41 of the evaporator. The liquid refrigerant flash cools upon discharge in the evaporator, remaining liquid refrigerant wetting the tubes to cool medium passing through the tubes. The heat exchange relation between medium passing through the tubes and the liquid refrigerant upon the exterior of the tubes evaporates the liquid refrigerant, vapor passing to the absorber, as previously described.

A suitable purge arrangement 42 is provided to remove non-condensible gases from the absorber. The ejector 43 of purge arrangement 42 is connected by line 44 to a purge line 45 extending longitudinally of the absorber. The cooling coil 46 of purge arrangement 42 is connected to line 35 by line 47 and to line 36 by line 48 permitting chilled water to be employed for cooling solution in the purge tank 49. Purge arrangement 42 is disclosed and claimed in application Serial No. 565,324, filed February 14, 1956, now patent No. 2,940,273, granted June 14, 1960, and reference is made to such application for a more complete description of the purging arrangement.

A liquid heating medium such as hot water is supplied to the generator tubes 8 through line 55 connected to a boiler or heater (not shown). The hot water supplied to the tubes 8, preferably, may be at a temperature within the range of about 210° F. to 400° F. although it is not necessary in the present invention to maintain the temperature of the hot water so supplied substantially constant. Hot water leaves the tubes 8 of the generator through line 60 and is returned to the heater.

A three-way modulating valve 61 is placed in line 55 to regulate the amount of hot water passing through the generator tubes or bypassing the generator tubes. Valve 61 is connected to line 60 by line 62 to permit hot water to bypass the generator tubes. Valve 61 is automatically operated, as hereinafter described.

The term "hot water" is used herein to indicate water at a temperature within the range of about 210° F. to about 400° F. It will be understood other liquid heating mediums may be employed instead of water to supply heat to the generator if desired.

Valve 61, when the system is shut down, is normally closed to passage of water through line 55 to the generator tubes 8, permitting water to flow through bypass line 62 without passing through the generator tubes 8. Valve 61 is regulated by a control 63 which may be pneumatically operated and which is actuated by a temperature sensing element such as a bulb 64, preferably, placed in the overflow arrangement 16 in a position in which strong solution leaving the generator passes thereover; if desired, of course, bulb 64 may be placed in or in contact with line 17.

Bulb 64 senses the temperature of strong solution leaving the generator so that control 63 in accordance with such temperature actuates valve 61 to regulate the quantity of hot water entering the tubes 8 or bypassing the tubes 8 thus maintaining a substantially constant predetermined temperature of strong solution leaving the generator which in effect controls the concentration of strong solution leaving the generator or in other words, prevents the concentration of strong solution leaving the generator from increasing beyond a predetermined point during full load operation.

Hot water is supplied to the generator tubes in heat exchange relation with solution in the generator. At full load, the quantity of hot water supplied to the generator in heat exchange relation with solution therein is regulated or varied in response to the temperature of strong solution leaving the generator. So regulating the supply of hot water to the generator maintains a desired solution temperature leaving the generator and maintains the temperature of strong solution leaving the generator substantially constant.

A preferred absorbing solution is a solution of lithium bromide in water. The preferred refrigerant is water. Concentration of solution leaving the generator may vary but preferably is about 66% during full load operation of the system and may go as high as 68% at low partial loads.

Considering the control arrangement for the present absorption refrigeration system, as previously described, bypass line 25 connects weak solution line 15 and strong solution line 17 adjacent the heat exchanger 14, modulating three-way valve 26 being placed at the juncture of bypass line 25 and weak solution line 15 to proportion the quantities of weak solution pasing through such lines. It will be understood that weak solution flow to the heat exchanger is constant under all low conditions.

Valve 26 is connected to a pneumatic control 27 which in turn is actuated by means of a bulb 28 placed adjacent line 36 in a position to sense the temperature of cooled medium leaving the evaporatior. It will be appreciated bulb 28 may be placed in contact with line 36 or may be placed in line 36 as desired.

Under full load conditions, all weak solution passes through line 15 to the generator and is discharged therein. However, as the load imposed upon the system decreases, as reflected by the temperature of chilled water leaving the evaporator, valve 26 is actuated to divert a portion of the flow through the weak solution line through the bypass line 25 to the strong solution line 17. So diverting weak solution varies the concentration of solution supplied to the absorber in accordance with cooled medium requirements. Generally speaking, only enough solution is sent to the generator for reconcentration as is required to keep the absorber solution at the desired concentration to meet load requirements. Although the generator may produce extremely high concentrations of salt under partial load conditions heretofore considered unsafe due to crystallization problems in the solution heat exchanger, the fact that the highly concentrated salt solution leaving the generator is immediately diluted with extremely dilute solution prevents solidification problems in the heat exchanger.

It will be appreciated when hot water is employed as the heating medium in the generator it is essential to control solution concentration at full load to prevent solidification problems in the heat exchanger. In order to prevent too high a temperature of strong solution leaving the generator and correspondingly great increase in concentration of such solution at full load, the flow of hot water through the generator tubes 8 is varied responsive to the temperature of strong solution leaving the generator. Since the quantity of hot water supplied to the generator is varied in response to the temperature of strong solution leaving the generator it will be appreciated a desired solution temperature is maintained in the generator thereby preventing any substantial increase in the temperature and concentration of solution leaving the generator at full load, permitting a desired concentration of solution to be supplied to the absorber in accordance with load requirements.

Considering operation of hte absorption refrigeration system, it will be appreciated that at start-up the generator contains a large amount of precipitated or crystallized lithium bromide salt. When the machine is started, medium to be cooled is forwarded through line 35 to the tubes 6 of the evaporator and leaves the tubes 6 of the evaporator through line 36. At start-up the pumps are actuated, pump 11 withdrawing weak solution from the absorber through line 12, forwarding the weak solution through line 13, heat exchanger 14 and line 15 to generator 8. It will be appreciated valve 26 gradually opens to permit full solution flow to the generator. At the same time, normally closed valve 61 is opened to permit the supply of hot water to the tubes 8 of generator 8'. In the generator, the solution flows over the top of the salt pile gradually dissolving the solid salt and returning the concentrated solution to the absorber where it can immediately go to work to produce useful refrigeration.

Refrigerant vapor is boiled from the solution in the generator 8', vapor passing to condenser 9' and being condensed therein, the condensate returning to the evaporator through line 37.

Strong solution leaves the generator through overflow arrangement 16, line 17, heat exchanger 14, and line 18 and is discharged preferably over an end of the absorber tube bundle. Strong solution is flash cooled to some slight extent as it is discharged in the absorber. The discharged strong solution mixes with solution in the absorber and is withdrawn from the absorber through outlet 21 and line 22 by pump 20, solution of intermediate concentration so formed being returned to the absorber through line 23 and being sprayed over the tube bundle by spray arrangement 24. It will be appreciated that the mixture of strong solution and the solution in the absorber forming the solution of intermediate concentration is further mixed and cooled during recirculation.

Pump 38 serves to withdraw liquid refrigerant from the pan 4 of the evaporator and to recirculate the liquid refrigerant through lines 39 and 40 to the discharge means 41 of the evaporator. The discharge means 41 sprays the liquid refrigerant over the tubes 6 of the evaporator. The tubes 6 are wetted by the liquid refrigerant, the wetted refrigerant being vaporized by being placed in heat exchange relation with the medium passing through the tubes. Vapor so formed passes outwardly through the eliminators and flows downward to the absorber being absorbed by solution therein.

Vapor or condensate is returned from the condenser 9' through line 37 to the evaporator being flash cooled upon discharge therein over tubes 6; thus, the vapor condensate aids in wetting the tubes to cool the medium passing therethrough.

Now, considering operation at full load conditions, the cooled medium rapidly cools down to design conditions. Valve 26 remains open to permit the full volume of weak solution to be supplied to the generator to dissolve the solid salt. Valve 61 is open, permitting supply of hot water to the tubes 8 of generator 8', the hot water being placed in heat exchange relation with solution therein. Valve 61 is regulated in response to the temperature of strong solution leaving the generator, thus modulating flow of hot water through the generator tubes to maintain a substantially constant, predetermined temperature of strong solution leaving the generator so that over concentration of solution at full load cannot occur.

Assuming the system goes in operation at partial load, as indicated by a decrease in the temperature of cooled medium leaving the evaporator reflected by bulb 28, control 27 actuates valve 26 to throttle flow of weak solution to the generator, which bypasses some portion of the weak solution to the strong solution line 17 where it mixes with the strong solution prior to the entrance of the heat exchanger 14. At the same time, since this solution is passing to the generator, temperature and concentration of solution in the generator tends to increase. Such increase in solution temperature in the generator is reflected by the temperature of strong solution leaving the generator. In response to the increase in the temperature of strong solution leaving the generator, valve 61 is throttled to supply a less quantity of hot water to the generator tubes thereby maintaining solution temperature in the generator and preventing undesired increase in temperature and concentration of strong solution leaving the generator.

Even though the solution in the generator tends to begin to increase in concentration as soon as the system begins to operate at partial load, the solution leaving the generator is diluted to more than a safe concentration before it reaches the heat exchanger by the addition of weak solution thereto, preventing crystallization or precipitation in the heat exchanger.

Under some circumstances, at extremely low loads, where all strong solution is being bypassed about the generator, it will be appreciated that strong solution will not come in contact with bulb 64 so that bulb 64 is not capable of sensing the temperature of strong solution leaving the generator; hence, the temperature reflected by bulb 34 would tend to decrease, thus furnishing an incorrect indication of the quantity of hot water to be supplied to the generator tubes to maintain a desired mean effective temperature difference.

In FIGURE 2, I have shown a modified control arrangement for operation of the system when strong solution does not pass from the generator or flow to a position in which bulb 64 can sense or reflect its temperature. A control 80 is provided adapted to be actuated by a bulb 81 placed in a position to sense the temperature of hot water leaving the generator. Control 80 is also connected to valve 61; thus, at partial load conditions if the temperature of bulb 64 decreases below a predetermined point indicating that it has failed to sense the temperature of strong solution leaving the generator, control 80 serves to override control 63, actuating valve 61 in response to the temperature of hot water leaving the generator.

It will be appreciated that the controls are so arranged that control 80 supersedes or overrides control 63 only when strong solution does not leave the generator which would permit the temperature sensed by bulb 64 to decrease below a predetermined point. When this predetermined point is reached, control 80 intervenes and regulates valve 61 in response to the temperature of hot water leaving the generator. While the various controls of the present invention have been described as pneumatically operated, it will be appreciated that any electrical or electronically operated controls may be provided.

The present control arrangement for an absorption refrigeration system permits low condensing temperatures during partial load operations thus greatly reducing tendencies to scaling of the condenser tubes. Satisfactory operation is assured under any circumstances even down to zero load if desired.

The control arrangement of the present invention tends to maintain the same generator conditions employing a liquid heating medium such as hot water as are obtained with a constant steam pressure type generator. The control arrangement of the present invention prevents solidification problems in the solution heat exchanger at full load and prevents too rapid precipitation of salt in the generator when the machine is initially going on partial load operation which would result in instability. The present invention prevents generator temperatures from reaching excessive temperatures at zero load which would result in corrosion problems over a long period of time and might also result in eutectic mixtures which are insoluble.

The present invention permits the effective use of liquid heating mediums such as hot water in the generator to heat solution and is designed to maintain a desired mean effective temperature difference in the generator regardless of the load imposed upon the machine. The control arrangement serves to control full load solution concentration and prevents solution concentration at full load from increasing beyond design conditions.

During partial load operation, the control arrangement directly controls the temperature and concentration of solution leaving the generator at extremely low loads; for example, when strong solution does not pass from the generator, the control arrangement permits the system to be regulated in response to the temperature of hot water leaving the generator.

While I have described a preferred embodiment of the invention, it will be understood the invention is not limited thereto since it may be otherwise embodied within the scope of the following claims.

I claim:

1. In a method of operation of an absorption refrigeration system including an absorber, an evaporator, a generator, a condenser, a heat exchanger for strong and weak solutions, and employing a saline solution as an absorbent and a material miscible therewith as a refrigerant, the steps which consist in supplying weak solution from the absorber to the generator, supplying strong solution from the generator to the absorber, supplying a liquid heating medium to the generator in heat exchange relation with solution therein, supplying a condensing medium to the condenser in heat exchange relation with vapor therein to condense the same, returning the condensate to the evaporator, regulating the quantity of liquid heating medium supplied to the generator in response to the temperature of strong solution leaving the generator, at partial load, diverting at least a portion of the weak solution to return to the absorber prior to its passage in heat exchange relation with liquid heating medium in the generator, and mixing the diverted weak solution with strong solution prior to the passage of the strong solution to said heat exchanger for strong and weak solutions.

2. A method according to claim 1 including the step of varying the quantity of liquid heating medium supplied to the generator in response to the temperature of liquid heating medium leaving the generator when strong solution does not flow from the generator.

3. A method according to claim 1 including the step of varying the quantity of weak solution diverted responsive to load imposed on the system.

4. A method according to claim 1 including the step of varying the quantity of weak solution diverted responsive to the temperature of cooled medium leaving the evaporator.

5. In a method of regulating the operation of an absorption refrigeration system employing a saline solution as an absorbent and a material miscible therewith as a refrigerant, the steps which consist in supplying a liquid heating medium to a generator in heat exchange relation with solution therein, regulating the quantity of liquid heating medium supplied to the generator in heat exchange relation with solution therein, in response to the temperature of strong solution leaving the generator, precipitating salt from the solution in the generator to decrease the capacity of the system and, upon a demand for increased capicity, dissolving the precipitated salt in solution in the generator.

6. A method according to claim 5 including the step of varying the quantity of liquid heating medium supplied to the generator in response to the temperature of liquid heating medium leaving the generator when strong solution does not flow from the generator.

7. A method of operation of an absorption refrigeration system according to claim 5 in which the steps of precipitating salt from solution in the generator and again absorbing the precipitated salt are conducted automatically in response to the temperature of cooled medium leaving the evaporator.

8. In an absorption refrigeration system the combination of an absorber, an evaporator, a generator, a condenser, means for passing weak solution from the absorber to the generator, means for passing strong solution from the generator to the absorber, means for supplying a liquid heating medium to the generator, means for regulating the supply of liquid heating medium to the generator, a control arrangement operable in response to the temperature of strong solution leaving the generator to actuate said regulating means, and means adapted upon partial load imposed on the system to precipitate salt from solution in the generator thereby decreasing the capacity of the system, said precipitating means upon an increase in load imposed upon the system permitting solution in the generator to dissolve the precipitated salt thereby increasing the capacity of the system.

9. An absorption refrigeration system according to claim 8 in which means are provided for regulating the supply of liquid heating medium to the generator in response to the temperature of liquid heating medium leaving the generator when strong solution does not flow from the generator.

10. An absorption refrigeration system according to claim 8 in which means are provided to actuate the salt precipitating means in response to load imposed upon the system.

11. An absorption refrigeration system according to claim 10 in which the actuating means are responsive to load imposed upon the system as reflected by the temperature of cooled medium leaving the evaporator.

12. An absorption refrigeration system according to claim 11 in which means are provided for regulating the supply of liquid heating medium to the generator in response to the temperature of liquid heating medium leaving the generator when strong solution does not flow from the generator.

13. In an absorption refrigeration system, the combination of an absorber, an evaporator, a generator, a condenser, means for passing strong solution from the generator to the absorber, means for passing weak solution from the absorber to the generator, means for supplying liquid heating medium to the generator in heat exchange relation with solution therein, means for regulating the quantity of liquid heating medium supplied to the generator, a control arrangement for said regulating means operable in response to temperature of strong solution leaving the generator to actuate the regulating means to maintain the temperature of strong solution leaving the generator at a substantially constant predetermined temperature at full load, means for supplying condensing medium to the condenser, a heat exchanger for placing the strong and weak solutions in heat exchange relation during their passage between the absorber and the generator and means for diverting at least a portion of the weak solution prior to its passage in heat exchange relation with heating medium in the generator to mix with strong solution passing from the generator to the absorber prior to the passage of the strong solution through said heat exchanger for placing the strong and weak solutions in heat exchange relation.

14. An absorption refrigeration system according to claim 13 in which means are provided for regulating the supply of liquid heating medium to the generator in response to the temperature of liquid heating medium leaving the generator when strong solution does not flow from the generator.

15. In an absorption refrigeration system, the combination of an absorber, an evaporator, a generator, a condenser, a heat exchanger to place strong and weak solutions in heat exchange relation, a first line connecting the absorber with the generator through the heat exchanger, means for passing weak solution through the first line, a second line connecting the generator with the absorber through the heat exchanger permitting the supply of strong solution from the generator to the absorber, means for supplying condensing medium to the condenser, means for supplying liquid heating medium to the generator in heat exchange relation with solution therein, valve means for regulating the supply of liquid heating medium to the generator, a control arrangement for said valve means responsive to the temperature of strong solution leaving the generator to vary the quantity of liquid heating medium supplied to the generator in heat exchange relation with solution therein, a third line connecting the first line and the second line, a modulating valve placed at the juncture of the first and third lines, and a control to actuate said valve, said control being responsive to the temperature of cooled medium leaving the evaporator to actuate the valve to vary the amount of weak solution mixed with strong solution in the strong solution line prior to the passage of strong solution to said heat exchanger for strong and weak solutions.

16. An absorption refrigeration system according to claim 15 in which the control arrangement includes means for regulating the supply of liquid heating medium to the generator in response to the temperature of liquid heating medium leaving the generator when strong solution does not flow from the generator.

References Cited in the file of this patent

UNITED STATES PATENTS

| | | |
|---|---|---|
| 2,648,957 | Berestneff | Aug. 18, 1953 |
| 2,679,733 | Ashley | June 1, 1954 |